(12) United States Patent
Yang et al.

(10) Patent No.: US 12,464,520 B2
(45) Date of Patent: Nov. 4, 2025

(54) DELAYED HARQ-ACK REPORT FOR SPS

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/018,024

(22) PCT Filed: Sep. 14, 2021

(86) PCT No.: PCT/US2021/050285
§ 371 (c)(1),
(2) Date: Jan. 25, 2023

(87) PCT Pub. No.: WO2022/060738
PCT Pub. Date: Mar. 24, 2022

(65) Prior Publication Data
US 2023/0276440 A1    Aug. 31, 2023

(30) Foreign Application Priority Data

Sep. 18, 2020    (GR) .............................. 20200100567

(51) Int. Cl.
*H04W 72/1273*    (2023.01)
*H04L 1/1812*    (2023.01)
(Continued)

(52) U.S. Cl.
CPC ....... *H04W 72/1273* (2013.01); *H04L 1/1812* (2013.01); *H04L 5/1469* (2013.01); *H04W 72/11* (2023.01)

(58) Field of Classification Search
CPC ............. H04W 72/1273; H04W 72/11; H04W 72/0446; H04L 1/1812; H04L 5/1469;
(Continued)

(56) References Cited

U.S. PATENT DOCUMENTS

2019/0356455 A1    11/2019 Yang et al.
2022/0399978 A1*   12/2022 Gao ...................... H04L 5/0055
(Continued)

FOREIGN PATENT DOCUMENTS

EP         3621382 A1    3/2020
WO       2019103809      5/2019
(Continued)

OTHER PUBLICATIONS

International Search Report and Written Opinion—PCT/US2021/050285—ISA/EPO—Dec. 2, 2021.

*Primary Examiner* — Rushil P. Sampat
(74) *Attorney, Agent, or Firm* — Arent Fox, LLP

(57) ABSTRACT

A method of wireless communication includes determining, by a user equipment (UE), that one or more symbols scheduled for reporting a hybrid automatic repeat request (HARQ) acknowledgement (HARQ-ACK) to a base station for a semi-persistent scheduling (SPS) physical downlink shared channel (PDSCH) transmission include at least one invalid symbol, wherein the one or more symbols are located in a first slot or sub-slot; selecting, by the UE, based on one or more parameters of the SPS PDSCH transmission, a second slot or sub-slot, subsequent to the first slot or sub-slot, for sending a delayed HARQ-ACK for the SPS PDSCH transmission; and sending, by the UE to the base station, the delayed HARQ-ACK for the SPS PDSCH transmission on the second slot or sub-slot.

28 Claims, 9 Drawing Sheets

(51) Int. Cl.
*H04L 5/14* (2006.01)
*H04W 72/11* (2023.01)

(58) Field of Classification Search
CPC ... H04L 1/1854; H04L 5/0078; H04L 1/1864; H04L 1/1887; H04L 5/0055; H04L 5/0094
See application file for complete search history.

(56) References Cited

U.S. PATENT DOCUMENTS

2023/0006798 A1* 1/2023 Lee .................. H04L 5/0055
2023/0031360 A1* 2/2023 Zhang ................ H04L 1/1854

FOREIGN PATENT DOCUMENTS

WO    WO 2021088494 A1 *   5/2021
WO        2021194301 A1     9/2021

* cited by examiner

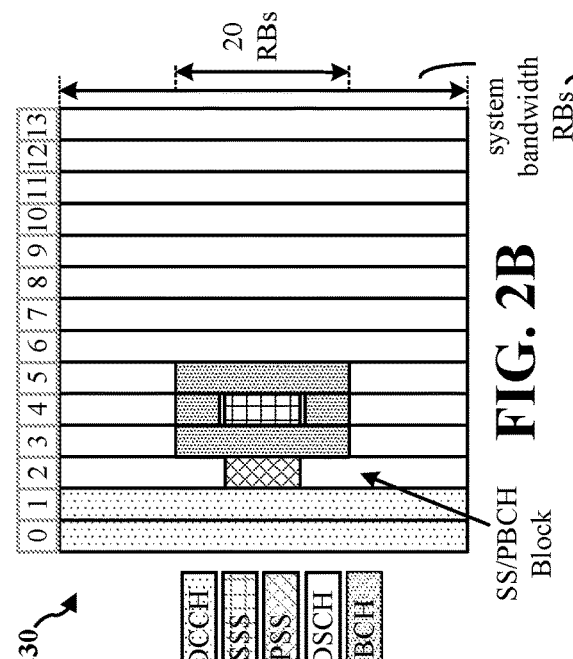
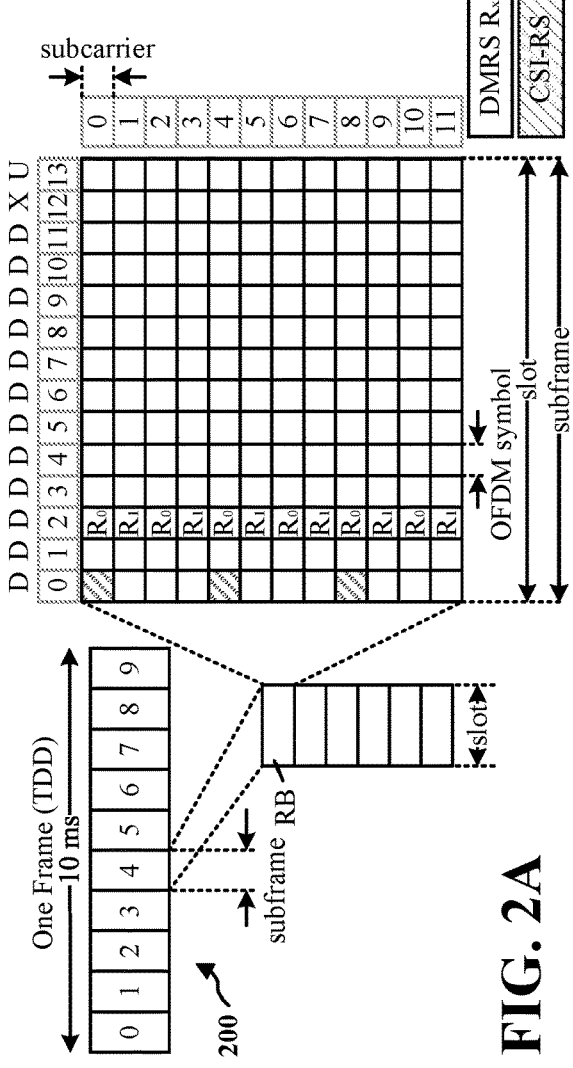
FIG. 2A
FIG. 2B
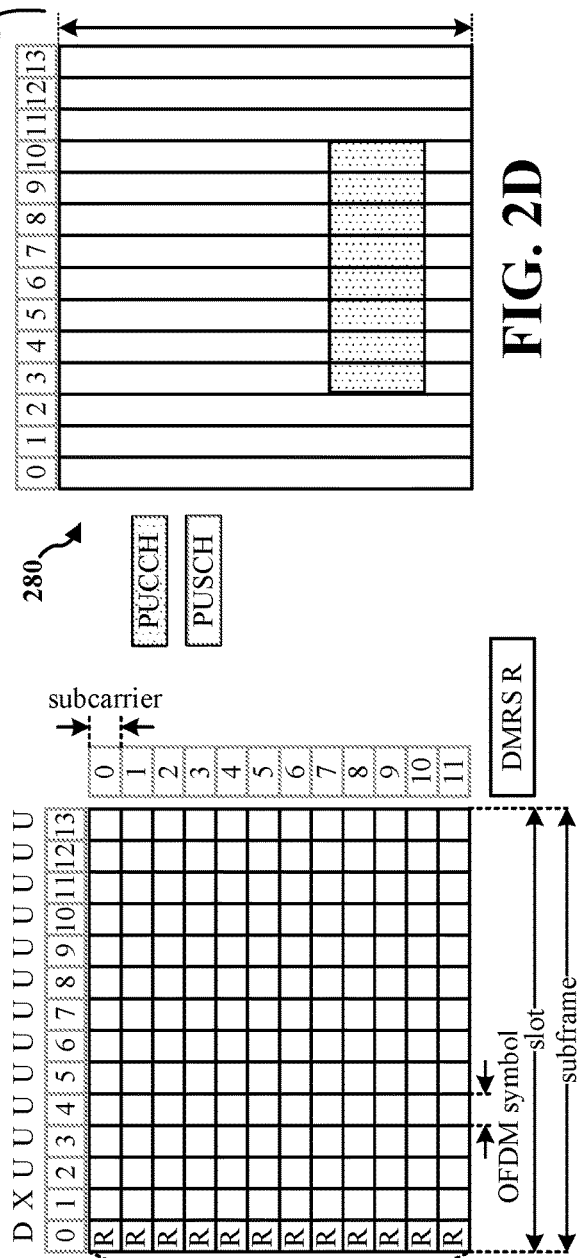
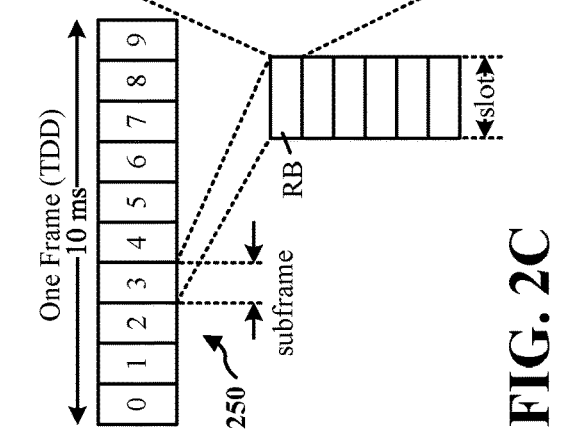
FIG. 2C
FIG. 2D

700

702

Determining, by a base station, that one or more symbols scheduled for a user equipment (UE) to report a hybrid automatic repeat request (HARQ) acknowledgement (HARQ-ACK) for a semi-persistent scheduling (SPS) physical downlink shared channel (PDSCH) transmission include a downlink symbol, wherein the one or more symbols are located in a first slot or sub-slot

704

Selecting, by the base station, based on one or more parameters of the SPS PDSCH transmission, a second slot or sub-slot, subsequent to the first slot or sub-slot, for receiving a delayed HARQ-ACK for the SPS PDSCH transmission

706

Receiving, by the base station from the UE, the delayed HARQ-ACK for the SPS PDSCH transmission on the second slot or sub-slot

FIG. 7

DELAYED HARQ-ACK REPORT FOR SPS

CROSS REFERENCE TO RELATED APPLICATION(S)

This application is a 35 U.S.C. § 371 National Phase of PCT Application Ser. No. PCT/US2021/050285, entitled "DELAYED HARQ-ACK REPORT FOR SPS" and filed on Sep. 14, 2021, which claims the benefit of Greek Application Serial No. 20200100567, entitled "DELAYED HARQ-ACK REPORT FOR SPS" and filed on Sep. 18, 2020, both of which are expressly incorporated by reference herein in their entirety.

BACKGROUND

The present disclosure relates generally to wireless communication systems, and more particularly, to semi-persistent scheduling (SPS) in wireless communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, computer-readable mediums, and apparatuses are provided.

In an aspect, a method of wireless communication includes determining, by a user equipment (UE), that one or more symbols scheduled for reporting a hybrid automatic repeat request (HARQ) acknowledgement (HARQ-ACK) to a base station for a semi-persistent scheduling (SPS) physical downlink shared channel (PDSCH) transmission include at least one invalid symbol, wherein the one or more symbols are located in a first slot or sub-slot. The method further includes selecting, by the UE, based on one or more parameters of the SPS PDSCH transmission, a second slot or sub-slot, subsequent to the first slot or sub-slot, for sending a delayed HARQ-ACK for the SPS PDSCH transmission. The method further includes sending, by the UE to the base station, the delayed HARQ-ACK for the SPS PDSCH transmission on the second slot or sub-slot.

In a further aspect, an apparatus for wireless communication includes a memory and at least one processor coupled with the memory. The at least one processor is configured to determine, by a UE, that one or more symbols scheduled for reporting a HARQ-ACK to a base station for a SPS PDSCH transmission include at least one invalid symbol, wherein the one or more symbols are located in a first slot or sub-slot. The at least one processor is further configured to select, by the UE, based on one or more parameters of the SPS PDSCH transmission, a second slot or sub-slot, subsequent to the first slot or sub-slot, for sending a delayed HARQ-ACK for the SPS PDSCH transmission. The at least one processor is further configured to send, by the UE to the base station, the delayed HARQ-ACK for the SPS PDSCH transmission on the second slot or sub-slot.

In another aspect, an apparatus for wireless communication includes means for determining, by a UE, that one or more symbols scheduled for reporting a HARQ-ACK to a base station for a SPS PDSCH transmission include at least one invalid symbol, wherein the one or more symbols are located in a first slot or sub-slot. The apparatus further includes means for selecting, by the UE, based on one or more parameters of the SPS PDSCH transmission, a second slot or sub-slot, subsequent to the first slot or sub-slot, for sending a delayed HARQ-ACK for the SPS PDSCH transmission. The apparatus further includes means for sending, by the UE to the base station, the delayed HARQ-ACK for the SPS PDSCH transmission on the second slot or sub-slot.

In a further aspect, a non-transitory computer-readable medium stores computer executable code. The computer executable code, when executed by a processor, causes the processor to determine, by a UE, that one or more symbols scheduled for reporting a HARQ-ACK to a base station for a SPS PDSCH transmission include at least one invalid symbol, wherein the one or more symbols are located in a first slot or sub-slot. The computer executable code, when executed by the processor, further causes the processor to select, by the UE, based on one or more parameters of the SPS PDSCH transmission, a second slot or sub-slot, subsequent to the first slot or sub-slot, for sending a delayed HARQ-ACK for the SPS PDSCH transmission. The computer executable code, when executed by the processor, further causes the processor to send, by the UE to the base station, the delayed HARQ-ACK for the SPS PDSCH transmission on the second slot or sub-slot.

In another aspect, a method of wireless communication includes determining, by a base station, that one or more symbols scheduled for a UE to report a HARQ-ACK for a SPS PDSCH transmission include at least one invalid symbol, wherein the one or more symbols are located in a first slot or sub-slot. The method further includes selecting, by the base station, based on one or more parameters of the SPS PDSCH transmission, a second slot or sub-slot, subsequent to the first slot or sub-slot, for receiving a delayed HARQ-ACK for the SPS PDSCH transmission. The method further includes receiving, by the base station from the UE, the delayed HARQ-ACK for the SPS PDSCH transmission on the second slot or sub-slot.

In a further aspect, an apparatus for wireless communication includes a memory and at least one processor coupled with the memory. The at least one processor is configured to determine, by a base station, that one or more symbols scheduled for a UE to report a HARQ-ACK for a SPS PDSCH transmission include at least one invalid symbol, wherein the one or more symbols are located in a first slot or sub-slot. The at least one processor is further configured to select, by the base station, based on one or more parameters of the SPS PDSCH transmission, a second slot or sub-slot, subsequent to the first slot or sub-slot, for receiving a delayed HARQ-ACK for the SPS PDSCH transmission. The at least one processor is further configured to receive, by the base station from the UE, the delayed HARQ-ACK for the SPS PDSCH transmission on the second slot or sub-slot.

In another aspect, an apparatus for wireless communication includes means for determining, by a base station, that one or more symbols scheduled for a UE to report a HARQ-ACK for a SPS PDSCH transmission include at least one invalid symbol, wherein the one or more symbols are located in a first slot or sub-slot. The apparatus further includes means for selecting, by the base station, based on one or more parameters of the SPS PDSCH transmission, a second slot or sub-slot, subsequent to the first slot or sub-slot, for receiving a delayed HARQ-ACK for the SPS PDSCH transmission. The apparatus further includes means for receiving, by the base station from the UE, the delayed HARQ-ACK for the SPS PDSCH transmission on the second slot or sub-slot.

In a further aspect, a non-transitory computer-readable medium stores computer executable code. The computer executable code, when executed by a processor, causes the processor to determine, by a base station, that one or more symbols scheduled for a UE to report a HARQ-ACK for a SPS PDSCH transmission include at least one invalid symbol, wherein the one or more symbols are located in a first slot or sub-slot. The computer executable code, when executed by the processor, further causes the processor to select, by the base station, based on one or more parameters of the SPS PDSCH transmission, a second slot or sub-slot, subsequent to the first slot or sub-slot, for receiving a delayed HARQ-ACK for the SPS PDSCH transmission. The computer executable code, when executed by the processor, further causes the processor to receive, by the base station from the UE, the delayed HARQ-ACK for the SPS PDSCH transmission on the second slot or sub-slot.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Some further example implementations are provided below.

A first example method of wireless communication, comprising: determining, by a user equipment (UE), that one or more symbols scheduled for reporting a hybrid automatic repeat request (HARQ) acknowledgement (HARQ-ACK) to a base station for a semi-persistent scheduling (SPS) physical downlink shared channel (PDSCH) transmission include at least one invalid symbol, wherein the one or more symbols are located in a first slot or sub-slot; selecting, by the UE, based on one or more parameters of the SPS PDSCH transmission, a second slot or sub-slot, subsequent to the first slot or sub-slot, for sending a delayed HARQ-ACK for the SPS PDSCH transmission; and sending, by the UE to the base station, the delayed HARQ-ACK for the SPS PDSCH transmission on the second slot or sub-slot.

A second example method of wireless communication, comprising: determining, by a base station, that one or more symbols scheduled for a user equipment (UE) to report a hybrid automatic repeat request (HARQ) acknowledgement (HARQ-ACK) for a semi-persistent scheduling (SPS) physical downlink shared channel (PDSCH) transmission include at least one invalid symbol, wherein the one or more symbols are located in a first slot or sub-slot; selecting, by the base station, based on one or more parameters of the SPS PDSCH transmission, a second slot or sub-slot, subsequent to the first slot or sub-slot, for receiving a delayed HARQ-ACK for the SPS PDSCH transmission; and receiving, by the base station from the UE, the delayed HARQ-ACK for the SPS PDSCH transmission on the second slot or sub-slot.

Any of the above methods of wireless communication, further comprising selecting, based on the one or more parameters of the SPS PDSCH transmission, a physical uplink control channel (PUCCH) resource for sending the delayed HARQ-ACK for the SPS PDSCH transmission.

Any of the above methods of wireless communication, wherein the selecting comprises selecting based on the one or more parameters comprising one or more of: a starting or ending resource block index of the SPS PDSCH transmission; a slot or sub-slot index of the SPS PDSCH transmission; a SPS configuration index of the SPS PDSCH transmission; or a configured scheduling (CS) radio network temporary identifier (CS-RNTI) of the UE.

Any of the above methods of wireless communication, wherein the selecting further comprises generating an offset value (K) as a function of the one or more parameters.

Any of the above methods of wireless communication, wherein the selecting further comprises selecting the second slot or sub-slot so as to be a $K^{th}$ slot or sub-slot subsequent to the first slot or sub-slot.

Any of the above methods of wireless communication, wherein the selecting further comprises selecting the second slot or sub-slot so as to be a $K^{th}$ uplink (U) slot or sub-slot subsequent to the first slot or sub-slot.

Any of the above methods of wireless communication, wherein the selecting further comprises selecting the second slot or sub-slot so as to be a $K^{th}$ uplink (U) or special (S) slot or sub-slot that is subsequent to the first slot or sub-slot and that includes sufficient uplink symbols to transmit the delayed HARQ-ACK.

Any of the above methods of wireless communication, wherein the selecting further comprises inputting the one or more parameters to a hash function to output the offset value.

Any of the above methods of wireless communication, wherein the selecting further comprises configuring the hash function based on a time division duplexing (TDD) pattern of a communication between the UE and the base station.

Any of the above methods of wireless communication, wherein the selecting further comprises configuring the hash function based on a quantity of special (S) or uplink (U) slots or sub-slots that are present subsequent to the first slot or sub-slot in a time division duplexing (TDD) pattern of a communication between the UE and the base station.

Any of the above methods of wireless communication, wherein the selecting further comprises: performing a division operation that divides a parameter of the SPS PDSCH transmission by a quantity of special (S) or uplink (U) slots or sub-slots that are present subsequent to the first slot or sub-slot in a time division duplexing (TDD) pattern of a communication between the UE and the base station; and selecting the offset value so as to be one plus a modulus of the division operation.

An apparatus for wireless communication, including a memory storing instructions; and at least one processor coupled with the memory and configured to execute the instructions to perform the operations of any of the above methods of wireless communication.

An apparatus for wireless communication, including means for performing the operations of any of the above methods of wireless communication.

A non-transitory computer-readable medium storing computer executable code that, when executed by a processor, causes the processor to perform the operations of any of the above methods of wireless communication.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 7 is a flowchart of an example method of wireless communication by a base station, in accordance with various aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G New Radio (NR), the concepts described herein may be applicable to other similar areas, such as Long Term Evolution (LTE), LTE Advanced (LTE-A), code division multiple access (CDMA), Global System for Mobile Communications (GSM), and other wireless technologies.

Aspects of the present disclosure allow for reporting delayed hybrid automatic repeat request (HARQ) acknowledgement (HARQ-ACK) for semi-persistent scheduling (SPS) physical downlink shared channel (PDSCH) transmissions. In some aspects, a user equipment (UE) and a base station may use one or more parameters of a SPS PDSCH transmission to determine a slot or sub-slot and/or a physical uplink control channel (PUCCH) resource for communication of a delayed HARQ-ACK report for the SPS PDSCH transmission. Accordingly, these aspects may distribute the HARQ-ACK reporting more evenly across various slots or sub-slot. Additional features of the present aspects are described in more detail below with respect to the appended drawings.

Figure 1:
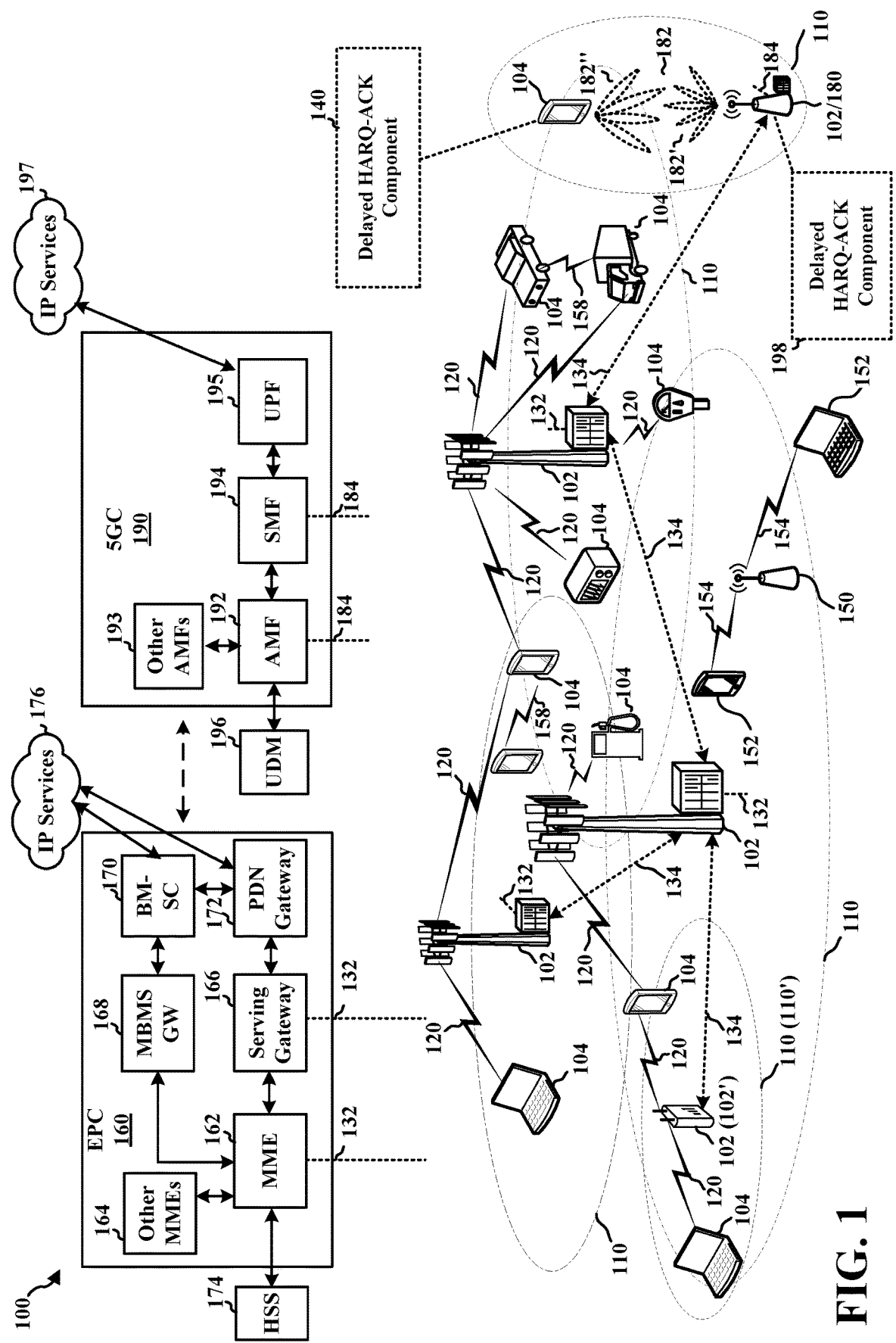
FIG. 1 is a diagram of an example of a wireless communication system and an access network, including at least one user equipment (UE) and at least one base station, each having a respective delayed hybrid automatic repeat request (HARQ) acknowledgement (HARQ-ACK) component configured to perform delayed HARQ-ACK reporting, in accordance with various aspects of the present disclosure.

Referring to FIG. 1, in accordance with various aspects of the present disclosure, an example wireless communications system and access network 100 includes a user equipment (UE) 104 having a delayed HARQ-ACK component 140 and a base station 102 (e.g., a gNB) having a delayed HARQ-ACK component 198 to implement delayed HARQ-ACK reporting for communication between the UE 104 and the base station 102. Further details of the operation of the delayed HARQ-ACK component 140 of the UE 104 and the delayed HARQ-ACK component 198 of the base station 102 are described below with reference to the appended drawings.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub-6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^{\mu}*15$ kHz, where y is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some aspects, NR provides support for downlink SPS for periodic traffic, so that a base station does not have to send a grant to a UE for every transmission. In NR, each slot may have one of three different slot directions: "D," "U," or "S," where "D" denotes a downlink slot that only includes downlink symbols, "U" denotes an uplink slot that only includes uplink symbols, and "S" denotes a special slot that includes both downlink and uplink symbols. A time division duplexing (TDD) system may have a TDD pattern of slots of various directions, for example, may include multiple consecutive "D" slots and/or multiple consecutive "U" slots. As part of SPS, a base station may indicate to a UE that HARQ-ACK for each downlink slot must be reported on a later slot having a fixed offset relative to that downlink slot, for example, that HARQ-ACK for each downlink slot must be reported on the slot immediately following that downlink slot. However, in a TDD system in Release 15/16, a slot scheduled according to SPS for reporting HARQ-ACK for a SPS PDSCH transmission may happen to be a downlink slot in the TDD pattern, in which case the UE will not transmit the HARQ-ACK report. This may waste system resources since the base station may need to retransmit the SPS PDSCH due to the missed HARQ-ACK report from the UE.

In some aspects, for dynamically scheduled PDSCH, each downlink data transmission is accompanied by a corresponding grant that indicates to the UE which slot to use for reporting a HARQ-ACK for that downlink data transmission. However, in aspects that implement SPS, PDCCH is not available in SPS, hence the base station is not able to separately indicate, for each one of the downlink data transmissions, which slot to use for reporting a corresponding HARQ-ACK for that particular downlink data transmission. Instead, as described above, the base station may indicate to the UE a same mechanism for reporting HARQ-ACK feedback for all downlink data transmissions, e.g., that HARQ-ACK must be reported for each downlink slot on the immediately following slot.

In some aspects of the present disclosure, HARQ-ACK reporting for SPS PDSCH may be improved by delaying those HARQ-ACK reports/feedbacks that conflict with downlink symbols/slots. For example, such HARQ-ACK reports/feedbacks may be delayed to a later slot/sub-slot which has sufficient uplink symbols to support the HARQ-ACK feedback, e.g., such HARQ-ACK reports/feedbacks may be delayed to later uplink symbols/slots.

Figure 3:
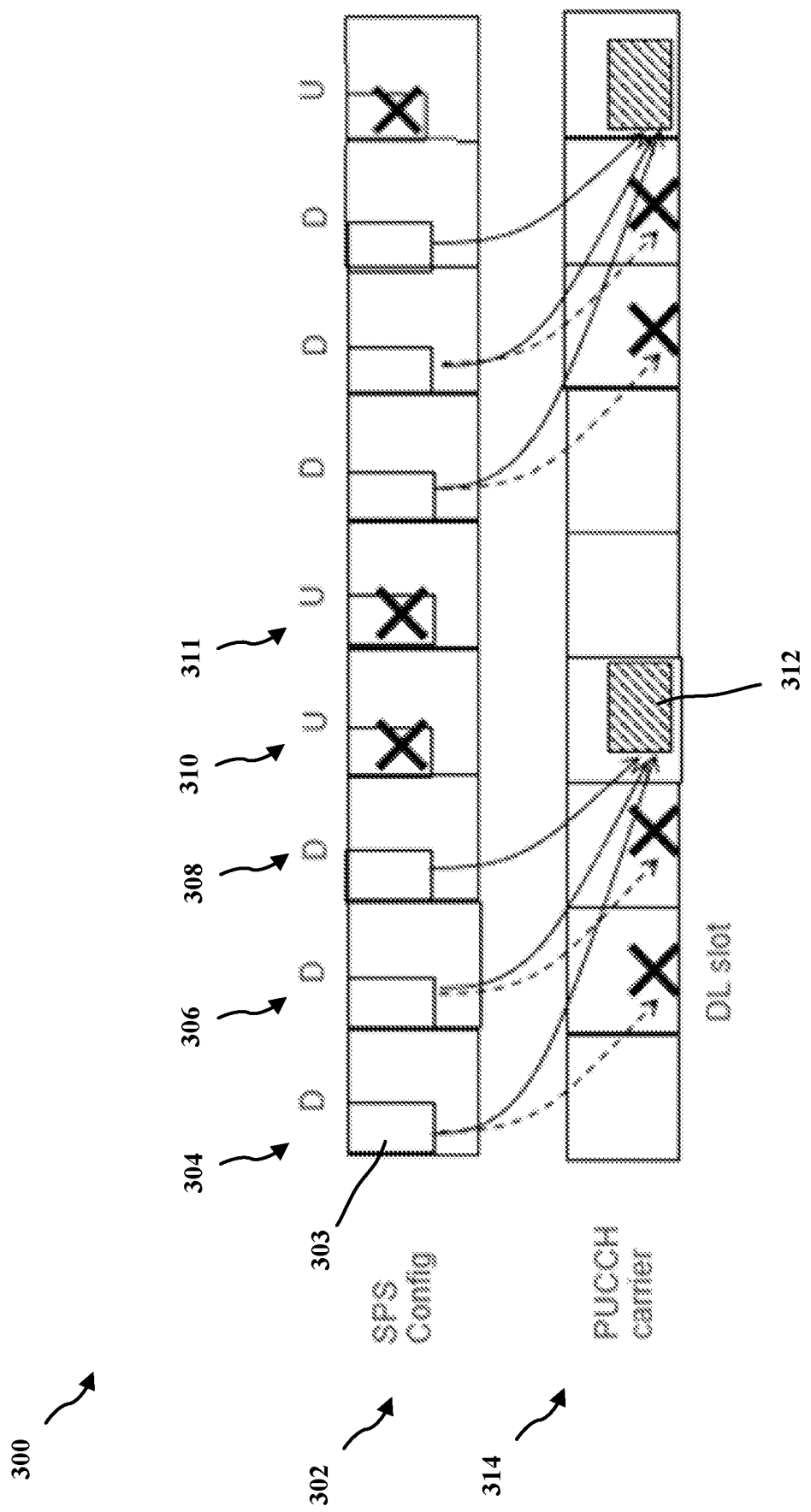
FIG. 3 is a block diagram of a first example slot configuration, in accordance with various aspects of the present disclosure.

Referring to FIG. 3, in an aspect, for example, a TDD system may implement a repeated TDD pattern 300 of slots within a frame. In this case, the TDD pattern 300 may be "D D D U U" and may include three consecutive "D" slots 304, 306, and 308, followed by two consecutive "U" slots 310 and 311. Further, a base station may define a SPS configuration 302 that configures a UE with an SPS transmission 303 in one or more slots, e.g., the periodicity of SPS may be set to one slot to configure a SPS transmission in every slot. Since the "U" slots 310 and 311 are defined as uplink slots in the TDD pattern 300, the base station may not send any downlink SPS transmissions in these slots. The base station may also indicate to the UE to send a HARQ-ACK feedback/report for each downlink SPS data transmission on the slot immediately following that downlink SPS data transmission.

Since the slot immediately following the "D" slot 304 is the "D" slot 306, the UE will not use the "D" slot 306 for sending the HARQ-ACK report of the downlink SPS data transmission received in the "D" slot 304. Instead, the UE may delay the HARQ-ACK report of the downlink SPS data transmission received in the "D" slot 304, and send a delayed HARQ-ACK report in the first "U" slot that follows the "D" slot 304 in the TDD pattern 300. That is, the UE will send the delayed HARQ-ACK report in the "U" slot 310, using a PUCCH resource 312 on the PUCCH carrier 314.

Similarly, the UE will not use the "D" slot 308 to transmit the HARQ-ACK report of the downlink SPS data transmission received in the "D" slot 306. Instead, the UE may delay the HARQ-ACK report of the downlink SPS data transmission received in the "D" slot 306, and send a delayed HARQ-ACK report in the "U" slot 310, using the PUCCH resource 312 on the PUCCH carrier 314.

For the "D" slot 308, since the slot immediately following the "D" slot 308 is the "U" slot 310, the UE does not need to delay the HARQ-ACK report of the downlink SPS data transmission received in the "D" slot 308, and will send the HARQ-ACK report in the "U" slot 310, using the PUCCH resource 312 on the PUCCH carrier 314.

As described above, in some aspects, the HARQ-ACK reports that conflict with downlink symbols may be delayed to the next slots/sub-slots which include sufficient uplink symbols to transmit the HARQ-ACK report. However, in a TDD system with many users, all UEs with the same TDD pattern 300 may delay their HARQ-ACK reports to the first uplink slot after the originally scheduled downlink slots. This may cause a congestion of HARQ-ACK reporting in the first uplink slot that follows a number of consecutive downlink slots (e.g., may cause a congestion in the "U" slot 310 that follows the three "D" slots 304, 306, and 308). This congestion may potentially hurt the reliability of the HARQ-ACK feedbacks/reports.

In contrast, some aspects allow for distributing the delayed HARQ-ACK reporting more evenly across uplink slots/sub-slots in a TDD pattern.

In some aspects, for example, for each SPS PDSCH transmission received by a UE from a base station, the UE may use one or more parameters of the SPS PDSCH transmission to determine a slot/sub-slot and/or a PUCCH resource for sending a delayed HARQ-ACK for that SPS PDSCH transmission. In some aspects, the parameters may include, for example, one or more of: (1) the starting/ending RB index of the SPS PDSCH transmission; (2) the slot/sub-slot index of the SPS PDSCH transmission; (3) the SPS configuration index; (4) the configured scheduling (CS) radio network temporary identifier (CS-RNTI) of the UE; or any other parameter that allows for distributed selection of one of multiple possible slots/sub-slots (e.g., one of multiple "U" or "S" slots in a TDD pattern) and/or one of multiple possible PUCCH resources (e.g., a first, second, or another PUCCH resource in a slot) for reporting a delayed HARQ-ACK of a SPS PDSCH transmission.

In an aspect, for example, a UE may input one or more parameters of a SPS PDSCH transmission to a function (e.g., a hash/hashing function) to determine a slot/sub-slot index and/or a PUCCH resource for sending a delayed HARQ-ACK report for that SPS PDSCH transmission.

In an aspect, for example, a hash function may receive one or more parameters of a SPS PDSCH transmission as input, to output an offset value "K" for determining a slot/sub-slot and/or a PUCCH resource for sending a delayed HARQ-ACK report for that SPS PDSCH transmission.

In one non-limiting aspect, for example, the slot/sub-slot selected for the delayed HARQ-ACK report may be the $K^{th}$ "U" slot/sub-slot after the slot/sub-slot in which the HARQ-ACK report was originally scheduled.

In an alternative or additional non-limiting aspect, for example, the slot/sub-slot selected for the delayed HARQ-ACK report may be the $K^{th}$ slot/sub-slot that includes enough uplink symbols to transmit the PUCCH resource for the HARQ-ACK report. For example, in an aspect, the slot/sub-slot selected for the delayed HARQ-ACK report may be the $K^{th}$ "U" or "S" slot/sub-slot that: (1) is located after the slot/sub-slot in which the HARQ-ACK report was originally scheduled; and (2) includes enough uplink symbols to transmit the PUCCH resource for the HARQ-ACK report. Accordingly, in locating such a $K^{th}$ slot/sub-slot, any slots/sub-slots that do not include enough uplink symbols will not be counted.

In another alternative or additional non-limiting aspect, for example, the slot/sub-slot selected for the delayed HARQ-ACK report may be the $K^{th}$ slot/sub-slot after the slot/sub-slot in which the HARQ-ACK report was originally scheduled. In this case, a mechanism may be implemented to ensure that the slot/sub-slot selected for the delayed HARQ-ACK is not a "D" slot/sub-slot and is not a slot/sub-slot that does not include enough uplink symbols to transmit the PUCCH resource for the HARQ-ACK report. For example, in an aspect, if the $K^{th}$ slot/sub-slot after the slot/sub-slot in which the HARQ-ACK report was originally scheduled turns out to be a "D" slot/sub-slot or turns out to be a slot/sub-slot that does not include enough uplink symbols to transmit the PUCCH resource for the HARQ-ACK report, then the delayed HARQ-ACK report may be further delayed. For example, the delayed HARQ-ACK report may be further delayed by another K slots/sub-slots.

In one non-limiting alternative or additional aspect, for example, the PUCCH resource selected for the delayed HARQ-ACK report may be the $K^{th}$ PUCCH resource available in a slot/sub-slot used for communicating the delayed HARQ-ACK.

Optionally, in an aspect, for example, the hashing function may depend on a TDD pattern of the SPS. For example, the hashing function may depend on the quantity of the "S" and/or "U" slots/sub-slots that follow the "D" slots/sub-slots in the TDD pattern.

Figure 4:
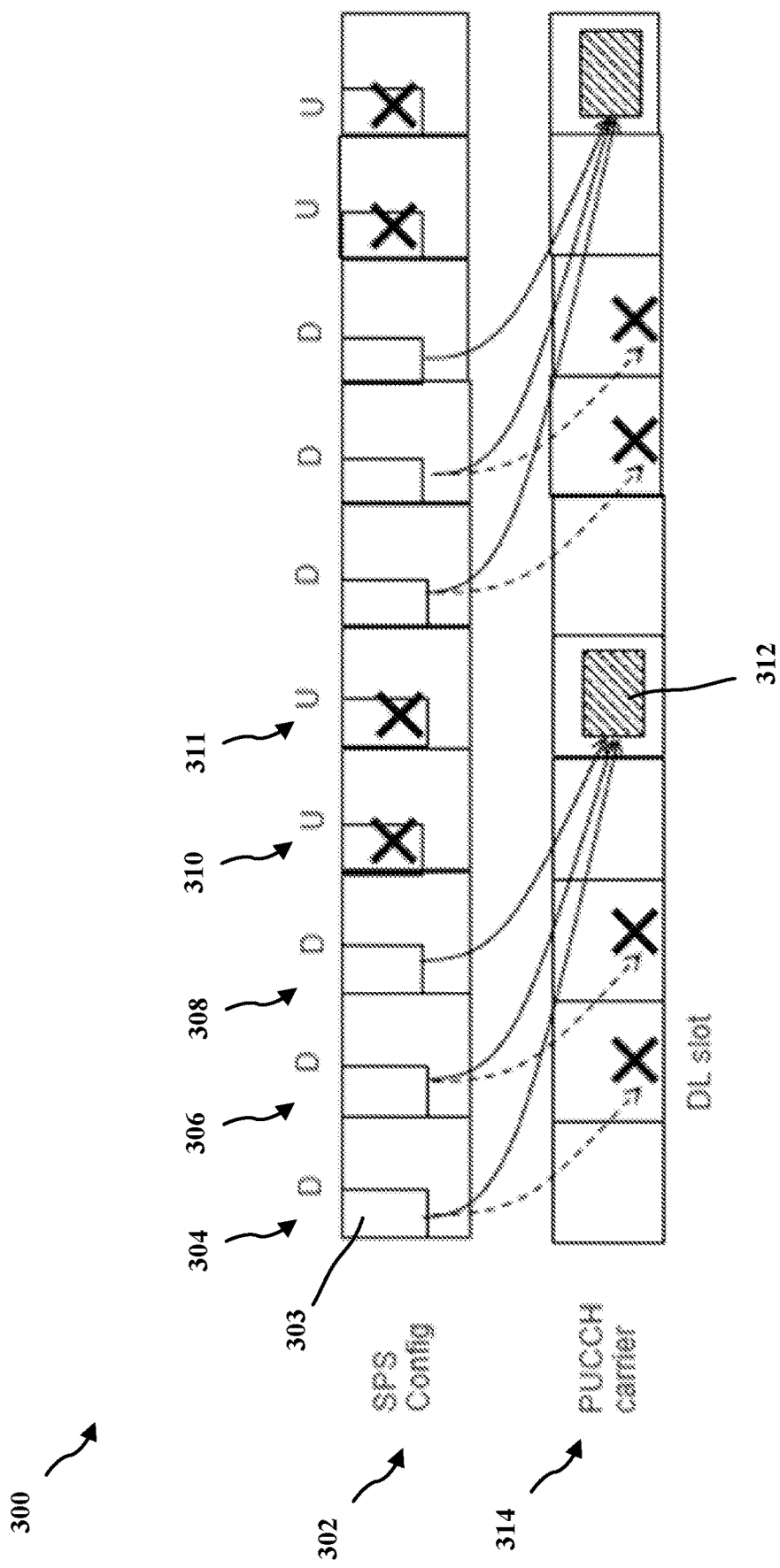
FIG. 4 is a diagram of a second example slot configuration, in accordance with various aspects of the present disclosure.

For example, referring to FIG. 4, in an aspect, when there are two "U" slots 310 and 311 following the "D" slots 304, 306, and 308 in the TDD pattern 300, each UE may use a hashing function to select one of the two "U" slots 310 and 311 for delayed HARQ-ACK reporting of each SPS PDSCH transmission. The hashing function may allow for distributed or pseudo-random selection of one of the two "U" slots 310 and 311. Accordingly, all UEs with the same TDD pattern 300 do not delay their HARQ-ACK reports to the same uplink slot after the originally scheduled downlink slots. Therefore, delayed HARQ-ACK reporting may be more evenly distributed across the two "U" slots 310 and 311.

For example, in one non-limiting aspect, in the TDD pattern 300, a UE may use a hashing function configured as:

$K=1+((\text{SPS PDSCH parameter})\bmod 2)$ where "mod" refers to the "modulo" function, and "A mod B" returns the remainder of dividing "A" by "B." In an aspect, for example, for each SPS PDSCH transmission that requires delayed HARQ-ACK reporting, a UE may use the above hashing function to determine the offset value "K." Further, in one non-limiting aspect, for example, a base station may indicate to the UE that the slot used for a delayed HARQ-ACK report for a SPS PDSCH transmission should be the $K^{th}$ "U" slot after the slot in which the HARQ-ACK report of that SPS PDSCH transmission was originally scheduled. Since there are two "U" slots 310 and 311 following the "D" slots 304, 306, and 308 in the TDD pattern 300, using the "mod 2" function allows for distributed or pseudo-random selection of one of the two "U" slots 310 and 311 for delayed HARQ-ACK reporting.

For example, in one non-limiting aspect, the SPS PDSCH parameter may be a starting PRB index for a SPS PDSCH transmission, and a UE may use a hashing function configured as:

$K=1+((\text{starting PRB index for SPS PDSCH})\bmod 2)$

Accordingly, if a SPS PDSCH starts on an odd RB, then the delayed HARQ-ACK will be transmitted in the second "U" slot after the slot in which the HARQ-ACK report was originally scheduled. Alternatively, if a SPS PDSCH transmission starts on an even RB, then the delayed HARQ-ACK report will be transmitted in the first "U" slot after the slot in which the HARQ-ACK report was originally scheduled.

In another non-limiting aspect, for example, in a TDD pattern that includes a quantity "N" of "U" slots after several consecutive "D" slots, a UE may use a hashing function configured as:

$$K=1+((\text{SPS PDSCH parameter})\bmod N)$$

such that using the "mod N" function allows for distributed or pseudo-random selection of one slot out of the quantity "N" of "U" slots for delayed HARQ-ACK reporting.

In the various aspects described herein, the offset value "K" may be alternatively or additionally used to select a PUCCH resource in a slot/sub-slot for reporting a delayed HARQ-ACK report. For example, in an aspect, a UE may be configured with a set of PUCCH resources, and any of such resources may be used to transmit a HARQ-ACK. In this case, instead of or in addition to selecting a slot/sub-slot for delayed HARQ-ACK reporting, a UE may use an offset value "K" output by a hashing function to select one PUCCH resource out of several possible PUCCH resources for reporting the delayed HARQ-ACK report. For example, instead of using a same PUCCH resource by default (e.g., using PUCCH resource number 1 by default), a UE may use an offset value "K" output by a hashing function for distributed or pseudo-random selection of one PUCCH resource out of several possible PUCCH resources for reporting a delayed HARQ-ACK report for each SPS PDSCH transmission.

For example, in one non-limiting aspect, if there are "N" possible PUCCH resources that can be used in a certain slot to transmit a HARQ-ACK report for a SPS PDSCH transmission, a UE may use a hashing function configured as:

$$K=1+((\text{starting PRB index for SPS PDSCH})\bmod N)$$

to obtain the offset value "K," and then use the $K^{th}$ PUCCH resource to transmit a HARQ-ACK report for the SPS PDSCH transmission.

In one non-limiting aspect, for example, one hashing function may be used to determine a slot/sub-slot for sending a delayed HARQ-ACK report for a SPS PDSCH transmission, and a different hashing function may be used to determine a PUCCH resource for sending the delayed HARQ-ACK report for the SPS PDSCH transmission. However, the present aspects are not so limited, and a same hashing function may be used to select a slot/sub-slot and also to select a PUCCH resource for sending a delayed HARQ-ACK report for a SPS PDSCH transmission.

In the various aspects described herein, the base station may implement similar functionalities as the UE to determine which slot/sub-slot and/or which PUCCH resource is used by a UE for communicating a delayed HARQ-ACK report of each SPS PDSCH transmission.

Figure 5:
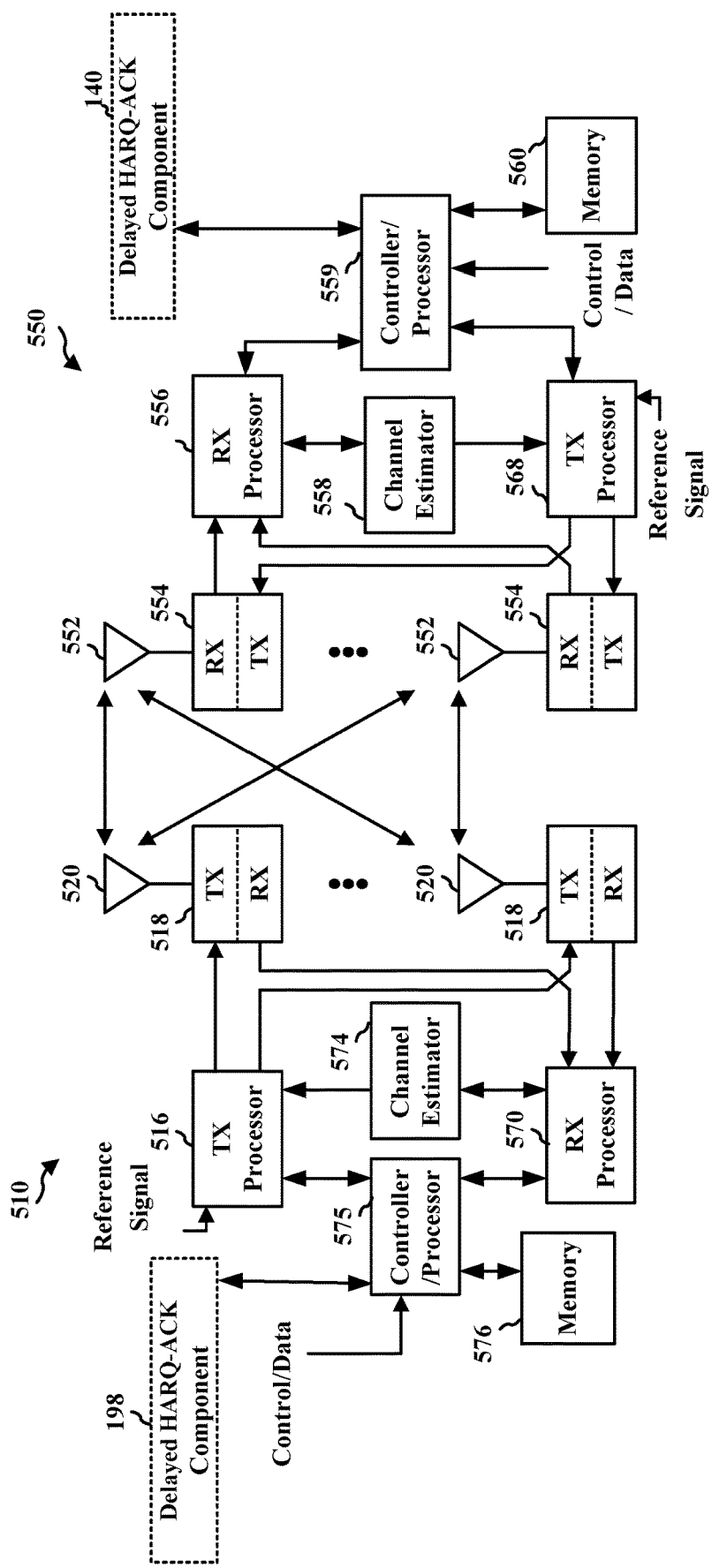
FIG. 5 is a block diagram of example components of the UE and the base station of FIG. 1 communicating in an access network, in accordance with various aspects of the present disclosure.

FIG. 5 is a block diagram of a base station 510 including a delayed HARQ-ACK component 198 in communication with a UE 550 including a delayed HARQ-ACK component 140 in an access network, where the base station 510 may be an example implementation of base station 102 and where UE 550 may be an example implementation of UE 104. In the DL, IP packets from the EPC 160 may be provided to a controller/processor 575. The controller/processor 575 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 575 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 516 and the receive (RX) processor 570 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream may then be provided to a different antenna 520 via a separate transmitter 518TX. Each transmitter 518TX may modulate an RF carrier with a respective spatial stream for transmission.

At the UE 550, each receiver 554RX receives a signal through its respective antenna 552. Each receiver 554RX recovers information modulated onto an RF carrier and provides the information to the receive (RX) processor 556. The TX processor 568 and the RX processor 556 implement layer 1 functionality associated with various signal processing functions. The RX processor 556 may perform spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 510. These soft decisions may be based on channel estimates computed by the channel estimator 558. The soft decisions are then decoded and deinterleaved to recover the data and control signals that were originally transmitted by the base station 510 on the physical channel. The data and control signals are then provided to the controller/processor 559, which implements layer 3 and layer 2 functionality.

The controller/processor 559 can be associated with a memory 560 that stores program codes and data. The memory 560 may be referred to as a computer-readable medium. In the UL, the controller/processor 559 provides demultiplexing between transport and logical channels, packet reassembly, deciphering, header decompression, and control signal processing to recover IP packets from the EPC 160. The controller/processor 559 is also responsible for error detection using an ACK and/or NACK protocol to support HARQ operations.

Similar to the functionality described in connection with the DL transmission by the base station 510, the controller/processor 559 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 558 from a reference signal or feedback transmitted by the base station 510 may be used by the TX processor 568 to select the appropriate coding and modulation schemes, and to facilitate spatial processing. The spatial streams generated by the TX processor 568 may be provided to different antenna 552 via separate transmitters 554TX. Each transmitter 554TX may modulate an RF carrier with a respective spatial stream for transmission.

The UL transmission is processed at the base station 510 in a manner similar to that described in connection with the receiver function at the UE 550. Each receiver 518RX receives a signal through its respective antenna 520. Each receiver 518RX recovers information modulated onto an RF carrier and provides the information to a RX processor 570.

The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover IP packets from the UE 550. IP packets from the controller/processor 575 may be provided to the EPC 160. The controller/processor 575 is also responsible for error detection using an ACK and/or NACK protocol to support HARQ operations.

At least one of the TX processor 568, the RX processor 556, and the controller/processor 559 may be configured to perform aspects in connection with the delayed HARQ-ACK component 140 of FIG. 1.

At least one of the TX processor 516, the RX processor 570, and the controller/processor 575 may be configured to perform aspects in connection with the delayed HARQ-ACK component 198 of FIG. 1.

Figure 6:
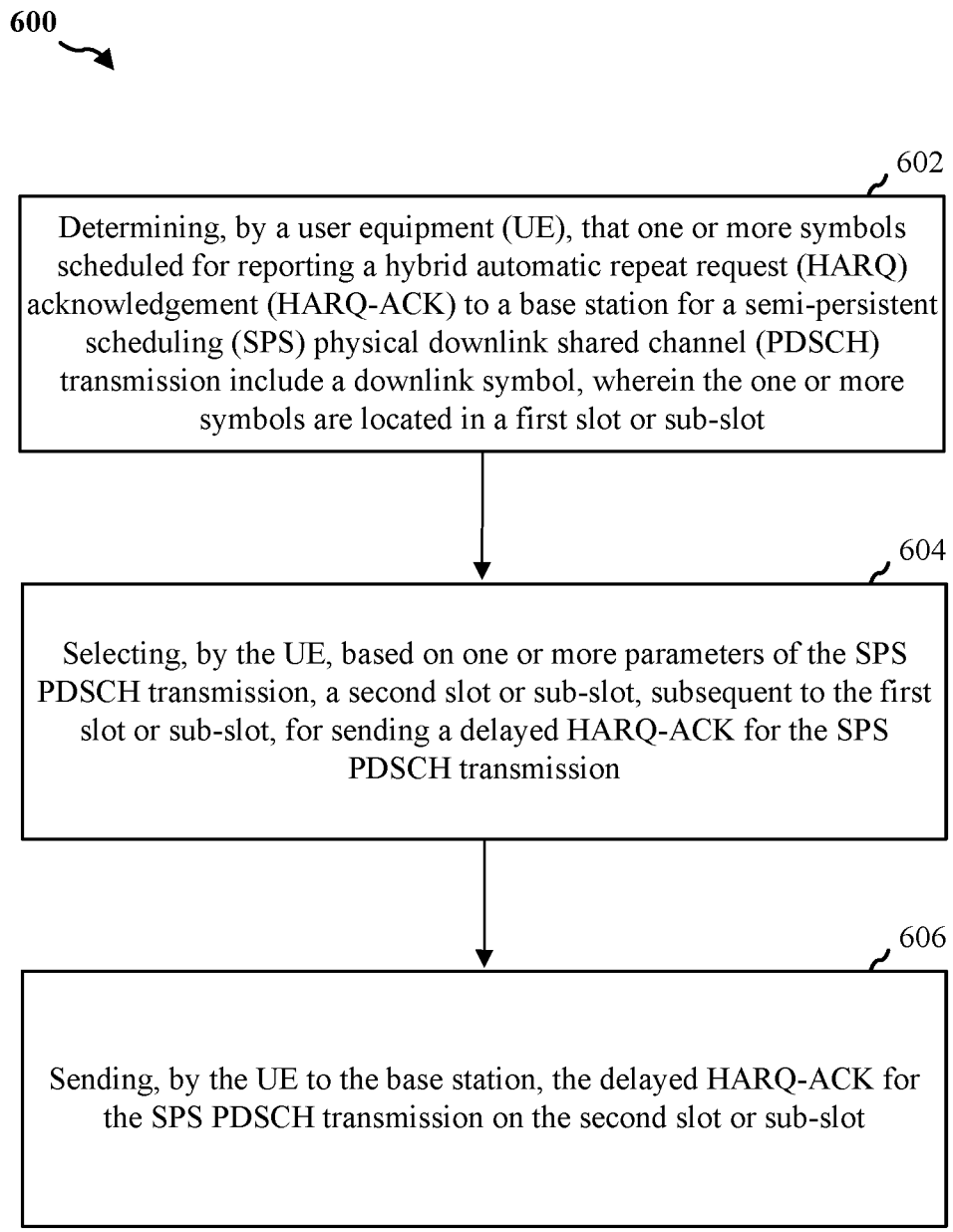
FIG. 6 is a flowchart of an example method of wireless communication by a UE, in accordance with various aspects of the present disclosure.

FIG. 6 is a flowchart of a method 600 of wireless communication. In an aspect, the method 600 may be performed by a wireless communication device, such as the UE 104 or 550, which may include the memory 560 and which may be the entire UE 104 or 550 or a component of the UE 104 or 550 such as the delayed HARQ-ACK component 140, the TX processor 568, the RX processor 556, and/or the controller/processor 559.

At 602, the method 600 includes determining, by a UE, that one or more symbols scheduled for reporting a HARQ-ACK to a base station for a SPS PDSCH transmission include at least one invalid symbol, wherein the one or more symbols are located in a first slot or sub-slot. For example, in an aspect, the UE 104 or 550, the delayed HARQ-ACK component 140, the TX processor 568, the RX processor 556, and/or the controller/processor 559 may determine that one or more symbols scheduled for reporting a HARQ-ACK to a base station for a SPS PDSCH transmission include at least one invalid symbol, wherein the one or more symbols are located in a first slot or sub-slot. Accordingly, in an aspect, the UE 104 or 550, the delayed HARQ-ACK component 140, the TX processor 568, the RX processor 556, and/or the controller/processor 559 may provide means for determining, by a UE, that one or more symbols scheduled for reporting a HARQ-ACK to a base station for a SPS PDSCH transmission include at least one invalid symbol, wherein the one or more symbols are located in a first slot or sub-slot.

For example, in various aspects, the at least one invalid symbol may include, but is not limited to, one or more semi-statically flexible symbols. In some non-limiting aspects, for example, a symbol may be treated as invalid if one of the following conditions hold.

Case 1: Semi-static DL symbols as determined from at least one of the following: 1) symbols indicated as downlink by TDD-ConfigurationCommon or TDD-UL-DL-ConfigDedicated; 2) symbols that are indicated to the UE by ssb-PositionInBurst in SIB1 or ssb-PositionInBurst in ServingCellConfigCommon for reception of SSB/PBCH blocks; 3) symbols that are indicated to the UE to receive CORESET 0 or CORESET for Type0-PDCCH CSS set.

Case 2: Semi-static "flexible" symbols, but later switched to DL symbols by a dynamic scheduling DCI for the UE to receive a dynamic PDSCH (e.g., in a downlink grant) or CSI-RS (e.g., in an uplink or downlink grant).

Case 3: Semi-static "flexible" symbols, but later switched to "DL" or "flexible" by a dynamic SFI (e.g., slot format indicator, which is DCI format 2_0)

Case 4: In addition, UE will cancel a HARQ-ACK for SPS PDSCH on semi-static flexible symbols if it does not detect an SFI.

For example, referring to FIG. 4, in an aspect, a UE may determine that a HARQ-ACK of a SPS PDSCH transmission received in the "D" slot 304 is scheduled to be reported on the immediately following slot which is the "D" slot 306.

At 604, the method 600 includes selecting, by the UE, based on one or more parameters of the SPS PDSCH transmission, a second slot or sub-slot, subsequent to the first slot or sub-slot, for sending a delayed HARQ-ACK for the SPS PDSCH transmission. For example, in an aspect, the UE 104 or 550, the delayed HARQ-ACK component 140, the TX processor 568, the RX processor 556, and/or the controller/processor 559 may select, based on one or more parameters of the SPS PDSCH transmission, a second slot or sub-slot, subsequent to the first slot or sub-slot, for sending a delayed HARQ-ACK for the SPS PDSCH transmission. Accordingly, in an aspect, the UE 104 or 550, the delayed HARQ-ACK component 140, the TX processor 568, the RX processor 556, and/or the controller/processor 559 may provide means for selecting, by the UE, based on one or more parameters of the SPS PDSCH transmission, a second slot or sub-slot, subsequent to the first slot or sub-slot, for sending a delayed HARQ-ACK for the SPS PDSCH transmission. For example, referring to FIG. 4, in an aspect, upon determining that a HARQ-ACK of a SPS PDSCH transmission received in the "D" slot 304 is scheduled to be reported on the immediately following slot, which happens to be another "D" slot 306, the UE may use a parameter of the SPS PDCSH transmission to select one of the "U" slots 310 or 311 for sending a delayed HARQ-ACK for the SPS PDSCH transmission received in the "D" slot 304.

At 606, the method 600 includes sending, by the UE to the base station, the delayed HARQ-ACK for the SPS PDSCH transmission on the second slot or sub-slot. For example, in an aspect, the UE 104 or 550, the delayed HARQ-ACK component 140, the TX processor 568, the RX processor 556, and/or the controller/processor 559 may send, to the base station, the delayed HARQ-ACK for the SPS PDSCH transmission on the second slot or sub-slot. Accordingly, in an aspect, the UE 104 or 550, the delayed HARQ-ACK component 140, the TX processor 568, the RX processor 556, and/or the controller/processor 559 may provide means for sending, by the UE to the base station, the delayed HARQ-ACK for the SPS PDSCH transmission on the second slot or sub-slot. For example, referring to FIG. 4, in an aspect, the UE may send the delayed HARQ-ACK report on the selected one of the "U" slots 310 or 311.

Optionally, the method 600 may further include selecting, by the UE, based on the one or more parameters of the SPS PDSCH transmission, a PUCCH resource for sending the delayed HARQ-ACK for the SPS PDSCH transmission. For example, in an aspect, the UE 104 or 550, the delayed HARQ-ACK component 140, the TX processor 568, the RX processor 556, and/or the controller/processor 559 may select, based on the one or more parameters of the SPS PDSCH transmission, a PUCCH resource for sending the delayed HARQ-ACK for the SPS PDSCH transmission. Accordingly, in an aspect, the UE 104 or 550, the delayed HARQ-ACK component 140, the TX processor 568, the RX processor 556, and/or the controller/processor 559 may provide means for selecting, by the UE, based on the one or more parameters of the SPS PDSCH transmission, a PUCCH resource for sending a delayed HARQ-ACK for the SPS PDSCH transmission. For example, referring to FIG. 4, in an aspect, the UE may use a parameter of the SPS PDCSH transmission to select a PUCCH resource in one of the "U" slots 310 or 311 for sending the delayed HARQ-ACK for the SPS PDSCH transmission received in the "D" slot 304.

Optionally, the selecting at 602 may further include selecting based on the one or more parameters comprising one or more of a starting or ending resource block index of the SPS PDSCH transmission, a slot or sub-slot index of the SPS PDSCH transmission, a SPS configuration index of the SPS PDSCH transmission, or a CS-RNTI of the UE.

Optionally, the selecting at 602 may further include generating an offset value "K" as a function of the one or more parameters.

Optionally, the selecting at 602 may further include selecting the second slot or sub-slot so as to be a $K^{th}$ slot or sub-slot subsequent to the first slot or sub-slot.

Optionally, the selecting at 602 may further include selecting the second slot or sub-slot so as to be a $K^{th}$ "U" slot or sub-slot subsequent to the first slot or sub-slot.

Optionally, the selecting at 602 may further include selecting the second slot or sub-slot so as to be a $K^{th}$ "U" or "S" slot or sub-slot that is subsequent to the first slot or sub-slot and that includes sufficient uplink symbols to transmit the delayed HARQ-ACK.

Optionally, the selecting at 602 may further include inputting the one or more parameters to a hash function to output the offset value.

Optionally, the selecting at 602 may further include configuring the hash function based on a TDD pattern of a communication between the UE and the base station.

Optionally, the selecting at 602 may further include configuring the hash function based on a quantity of "S" or "U" slots or sub-slots that are present subsequent to the first slot or sub-slot in a TDD pattern of a communication between the UE and the base station.

Optionally, the selecting at 602 may further include performing a division operation that divides a parameter of the SPS PDSCH transmission by a quantity of "S" or "U" slots or sub-slots that are present subsequent to the first slot or sub-slot in a TDD pattern of a communication between the UE and the base station.

Optionally, the selecting at 602 may further include selecting the offset value so as to be one plus a modulus of the division operation.

FIG. 7 is a flowchart of a method 700 of wireless communication. In an aspect, the method 700 may be performed by a wireless communication device, such as the base station 102 or 510, which may include the memory 576 and which may be the entire base station 102 or 510 or a component of the base station 102 or 510 such as the delayed HARQ-ACK component 198, the TX processor 516, the RX processor 570, and/or the controller/processor 575.

At 702, the method 700 includes determining, by a base station, that one or more symbols scheduled for a UE to report a HARQ-ACK to a base station for a SPS PDSCH transmission include at least one invalid symbol, wherein the one or more symbols are located in a first slot or sub-slot. For example, in an aspect, the base station 102 or 510, the delayed HARQ-ACK component 198, the TX processor 516, the RX processor 570, and/or the controller/processor 575 may determine that one or more symbols scheduled for a UE to report a HARQ-ACK to a base station for a SPS PDSCH transmission include at least one invalid symbol, wherein the one or more symbols are located in a first slot or sub-slot. Accordingly, in an aspect, the base station 102 or 510, the delayed HARQ-ACK component 198, the TX processor 516, the RX processor 570, and/or the controller/processor 575 may provide means for determining, by a base station, that one or more symbols scheduled for a UE to report a HARQ-ACK to a base station for a SPS PDSCH transmission include at least one invalid symbol, wherein the one or more symbols are located in a first slot or sub-slot.

For example, in various aspects, the at least one invalid symbol may include, but is not limited to, one or more semi-statically flexible symbols. In some non-limiting aspects, for example, a symbol may be treated as invalid if one of the following conditions hold.

Case 1: Semi-static DL symbols as determined from at least one of the following: 1) symbols indicated as downlink by TDD-ConfigurationCommon or TDD-UL-DL-ConfigDedicated; 2) symbols that are indicated to the UE by ssb-PositionInBurst in SIB1 or ssb-PositionInBurst in ServingCellConfigCommon for reception of SSB/PBCH blocks;

3) symbols that are indicated to the UE to receive CORESET 0 or CORESET for Type0-PDCCH CSS set.

Case 2: Semi-static "flexible" symbols, but later switched to DL symbols by a dynamic scheduling DCI for the UE to receive a dynamic PDSCH (e.g., in a downlink grant) or CSI-RS (e.g., in an uplink or downlink grant).

Case 3: Semi-static "flexible" symbols, but later switched to "DL" or "flexible" by a dynamic SFI (e.g., slot format indicator, which is DCI format 2_0)

Case 4: In addition, UE will cancel a HARQ-ACK for SPS PDSCH on semi-static flexible symbols if it does not detect an SFI.

For example, referring to FIG. 4, in an aspect, a base station may determine that a HARQ-ACK of a SPS PDSCH transmission transmitted in the "D" slot 304 is scheduled to be reported by a UE on the immediately following slot which is the "D" slot 306.

At 704, the method 700 includes selecting, by the base station, based on one or more parameters of the SPS PDSCH transmission, a second slot or sub-slot, subsequent to the first slot or sub-slot, for receiving a delayed HARQ-ACK for the SPS PDSCH transmission. For example, in an aspect, the base station 102 or 510, the delayed HARQ-ACK component 198, the TX processor 516, the RX processor 570, and/or the controller/processor 575 may select, based on one or more parameters of the SPS PDSCH transmission, a second slot or sub-slot, subsequent to the first slot or sub-slot, for receiving a delayed HARQ-ACK for the SPS PDSCH transmission. Accordingly, in an aspect, the base station 102 or 510, the delayed HARQ-ACK component 198, the TX processor 516, the RX processor 570, and/or the controller/processor 575 may provide means for selecting, by the base station, based on one or more parameters of the SPS PDSCH transmission, a second slot or sub-slot, subsequent to the first slot or sub-slot, for receiving a delayed HARQ-ACK for the SPS PDSCH transmission. For example, referring to FIG. 4, in an aspect, upon determining that a HARQ-ACK of a SPS PDSCH transmission in the "D" slot 304 is scheduled to be reported on the immediately following slot, which happens to be another "D" slot 306, the base station may use a parameter of the SPS PDCSH transmission to select one of the "U" slots 310 or 311 for receiving a delayed HARQ-ACK for the SPS PDSCH transmission transmitted in the "D" slot 304.

At 706, the method 700 includes receiving, by the base station from the UE, the delayed HARQ-ACK for the SPS PDSCH transmission on the second slot or sub-slot. For example, in an aspect, the base station 102 or 510, the delayed HARQ-ACK component 198, the TX processor 516, the RX processor 570, and/or the controller/processor 575 may receive, from the UE, the delayed HARQ-ACK for the SPS PDSCH transmission on the second slot or sub-slot. Accordingly, in an aspect, the base station 102 or 510, the delayed HARQ-ACK component 198, the TX processor 516, the RX processor 570, and/or the controller/processor 575 may provide means for receiving, by the base station from the UE, the delayed HARQ-ACK for the SPS PDSCH transmission on the second slot or sub-slot. For example, referring to FIG. 4, in an aspect, the base station may receive the delayed HARQ-ACK report on the selected one of the "U" slots 310 or 311.

Optionally, the method 700 may further include selecting, by the base station, based on the one or more parameters of the SPS PDSCH transmission, a PUCCH resource for receiving the delayed HARQ-ACK for the SPS PDSCH transmission. For example, in an aspect, the base station 102 or 510, the delayed HARQ-ACK component 198, the TX processor 516, the RX processor 570, and/or the controller/processor 575 may select, based on the one or more parameters of the SPS PDSCH transmission, a PUCCH resource for receiving the delayed HARQ-ACK for the SPS PDSCH transmission. Accordingly, in an aspect, the base station 102 or 510, the delayed HARQ-ACK component 198, the TX processor 516, the RX processor 570, and/or the controller/processor 575 may provide means for selecting, by the base station, based on the one or more parameters of the SPS PDSCH transmission, a PUCCH resource for receiving the delayed HARQ-ACK for the SPS PDSCH transmission. For example, referring to FIG. 4, in an aspect, the base station may use a parameter of the SPS PDCSH transmission to select a PUCCH resource in one of the "U" slots 310 or 311 for receiving the delayed HARQ-ACK for the SPS PDSCH transmission transmitted in the "D" slot 304.

Optionally, the selecting at 702 may further include selecting based on the one or more parameters comprising one or more of a starting or ending resource block index of the SPS PDSCH transmission, a slot or sub-slot index of the SPS PDSCH transmission, a SPS configuration index of the SPS PDSCH transmission, or a CS-RNTI of the UE.

Optionally, the selecting at 702 may further include generating an offset value "K" as a function of the one or more parameters.

Optionally, the selecting at 702 may further include selecting the second slot or sub-slot so as to be a $K^{th}$ slot or sub-slot subsequent to the first slot or sub-slot.

Optionally, the selecting at 702 may further include selecting the second slot or sub-slot so as to be a $K^{th}$ "U" slot or sub-slot subsequent to the first slot or sub-slot.

Optionally, the selecting at 702 may further include selecting the second slot or sub-slot so as to be a $K^{th}$ "U" or "S" slot or sub-slot that is subsequent to the first slot or sub-slot and that includes sufficient uplink symbols to transmit the delayed HARQ-ACK.

Optionally, the selecting at 702 may further include inputting the one or more parameters to a hash function to output the offset value.

Optionally, the selecting at 702 may further include configuring the hash function based on a TDD pattern of a communication between the UE and the base station.

Optionally, the selecting at 702 may further include configuring the hash function based on a quantity of "S" or "U" slots or sub-slots that are present subsequent to the first slot or sub-slot in a TDD pattern of a communication between the UE and the base station.

Optionally, the selecting at 702 may further include performing a division operation that divides a parameter of the SPS PDSCH transmission by a quantity of "S" or "U" slots or sub-slots that are present subsequent to the first slot or sub-slot in a TDD pattern of a communication between the UE and the base station.

Optionally, the selecting at 702 may further include selecting the offset value so as to be one plus a modulus of the division operation.

Figure 8:
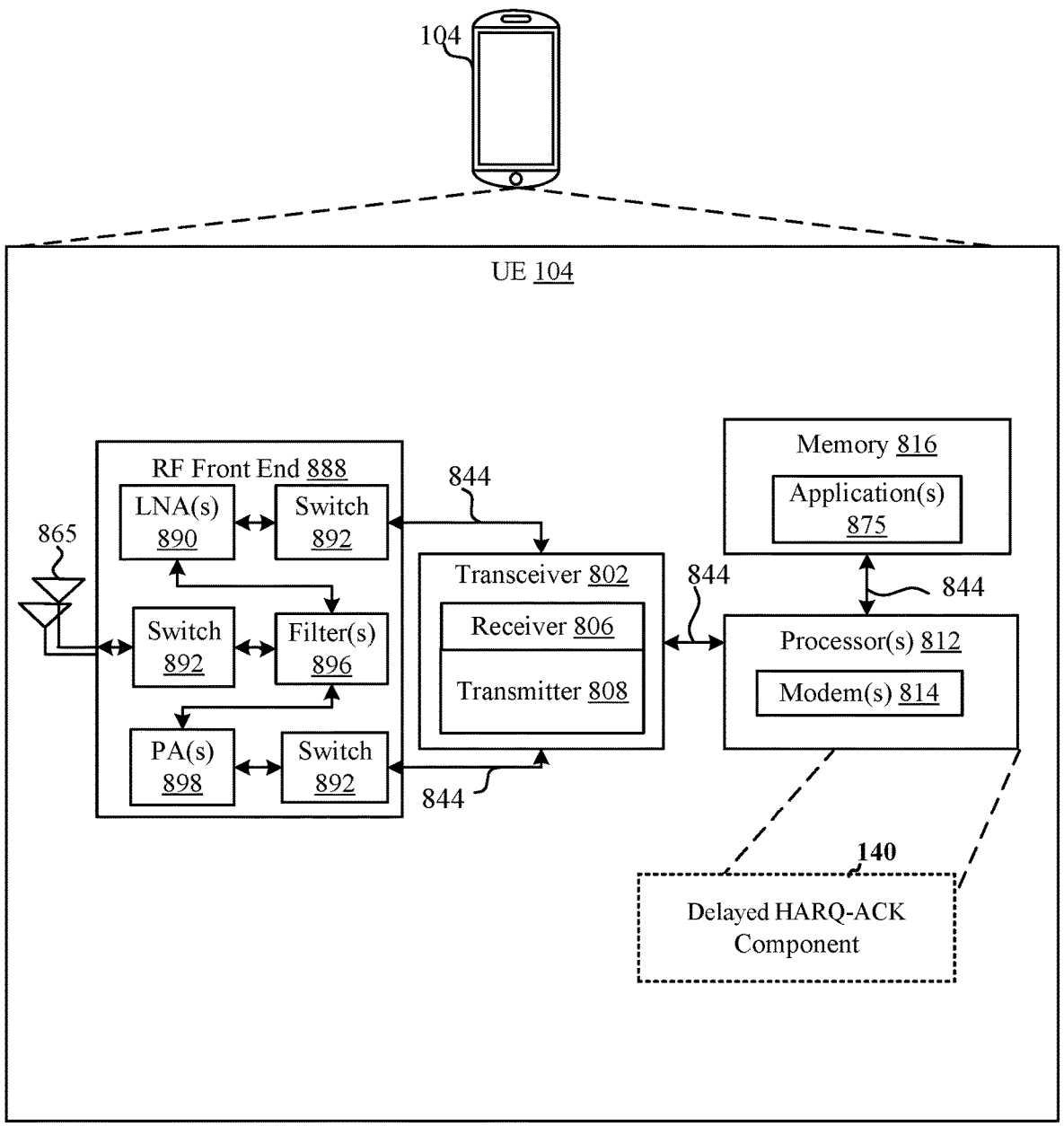
FIG. 8 is a block diagram of example components of the UE of FIG. 1, in accordance with various aspects of the present disclosure.

Referring to FIG. 8, one example of an implementation of UE 104 may include a variety of components, some of which have already been described above, but including components such as one or more processors 812 and memory 816 and transceiver 802 in communication via one or more buses 844, which may operate in conjunction with modem 814, and delayed HARQ-ACK component 140 to enable one or more of the functions described herein related to delayed HARQ-ACK. Further, the one or more processors 812, modem 814, memory 816, transceiver 802, RF front end 888 and one or more antennas 865 may be configured to support voice and/or data calls (simultaneously or non-simultaneously) in one or more radio access technologies. The antennas 865 may include one or more antennas, antenna elements, and/or antenna arrays.

In an aspect, the one or more processors 812 may include a modem 814 that uses one or more modem processors. The various functions related to delayed HARQ-ACK component 140 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with delayed HARQ-ACK component 140 may be performed by transceiver 802.

Also, memory 816 may be configured to store data used herein and/or local versions of applications 875, delayed HARQ-ACK component 140 and/or one or more of sub-components thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining delayed HARQ-ACK component 140 and/or one or more of subcomponents thereof, and/or data associated therewith, when UE 104 is operating at least one processor 812 to execute delayed HARQ-ACK component 140 and/or one or more subcomponents thereof.

Transceiver 802 may include at least one receiver 806 and at least one transmitter 808. Receiver 806 may include hardware, firmware, and/or software code executable by a processor for receiving data, the code including instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware, firmware, and/or software code executable by a processor for transmitting data, the code including instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 9:
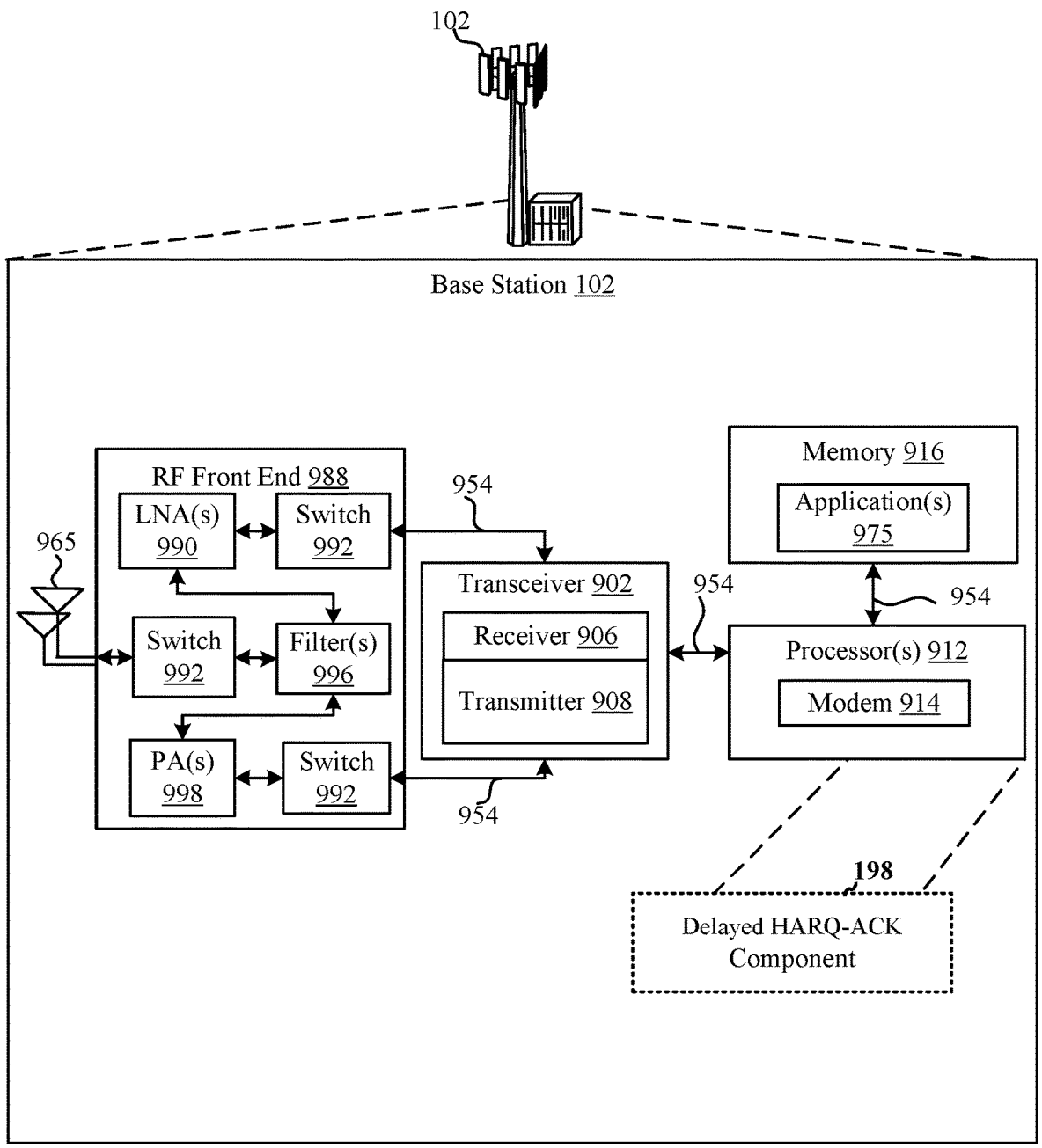
FIG. 9 is a block diagram of example components of the base station of FIG. 1, in accordance with various aspects of the present disclosure.

Referring to FIG. 9, one example of an implementation of base station 102 may include a variety of components, some of which have already been described above, but including components such as one or more processors 912 and memory 916 and transceiver 902 in communication via one or more buses 954, which may operate in conjunction with modem 914 and delayed HARQ-ACK component 198 to enable one or more of the functions described herein related to delayed HARQ-ACK.

The transceiver 902, receiver 906, transmitter 908, one or more processors 912, memory 916, applications 975, buses 954, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

Several aspects of telecommunication systems have been presented with reference to various apparatus and methods. These apparatus and methods have been described in the above detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   determining, by a user equipment (UE), that one or more symbols scheduled for reporting a hybrid automatic repeat request (HARQ) acknowledgement (HARQ-ACK) to a base station for a semi-persistent scheduling (SPS) physical downlink shared channel (PDSCH) transmission include at least one invalid symbol, wherein the one or more symbols are located in a first slot or sub-slot;
   generating, by the UE, an offset value (K) as a function of one or more parameters of the SPS PDSCH transmission;
   selecting, by the UE, a second slot or sub-slot, subsequent to the first slot or sub-slot, for sending a delayed HARQ-ACK for the SPS PDSCH transmission, comprising selecting the second slot or sub-slot so as to be at least K slots or sub-slots subsequent to the first slot or sub-slot; and
   sending, by the UE to the base station, the delayed HARQ-ACK for the SPS PDSCH transmission on the second slot or sub-slot.

2. The method of claim 1, further comprising selecting, by the UE, based on the one or more parameters of the SPS PDSCH transmission, a physical uplink control channel (PUCCH) resource for sending the delayed HARQ-ACK for the SPS PDSCH transmission.

3. The method of claim 1, wherein the selecting comprises selecting based on the one or more parameters comprising one or more of:
   a starting or ending resource block index of the SPS PDSCH transmission;
   a slot or sub-slot index of the SPS PDSCH transmission;
   a SPS configuration index of the SPS PDSCH transmission; or a configured scheduling (CS) radio network temporary identifier (CS-RNTI) of the UE.

4. The method of claim 1, wherein the second slot or sub-slot comprises a $K^{th}$ one of slots or sub-slots subsequent to the first slot or sub-slot.

5. The method of claim 1, wherein the second slot or sub-slot comprises a $K^{th}$ one of uplink (U) slots or sub-slots subsequent to the first slot or sub-slot.

6. The method of claim 1, wherein the second slot or sub-slot comprises a $K^{th}$ one of uplink (U) or special(S) slots or sub-slots that are subsequent to the first slot or sub-slot and that include sufficient uplink symbols to transmit the delayed HARQ-ACK.

7. The method of claim 1, wherein the selecting further comprises inputting the one or more parameters to a hash function to output the offset value.

8. The method of claim 7, wherein the selecting further comprises configuring the hash function based on a time division duplexing (TDD) pattern of a communication between the UE and the base station.

9. The method of claim 7, wherein the selecting further comprises configuring the hash function based on a quantity of special(S) or uplink (U) slots or sub-slots that are present subsequent to the first slot or sub-slot in a time division duplexing (TDD) pattern of a communication between the UE and the base station.

10. The method of claim 1, wherein the selecting further comprises:
performing a division operation that divides a parameter of the SPS PDSCH transmission by a quantity of special(S) or uplink (U) slots or sub-slots that are present subsequent to the first slot or sub-slot in a time division duplexing (TDD) pattern of a communication between the UE and the base station; and
selecting the offset value so as to be one plus a modulus of the division operation.

11. An apparatus for wireless communication, comprising:
a memory; and
at least one processor coupled with the memory and configured to:
determine, by a user equipment (UE), that one or more symbols scheduled for reporting a hybrid automatic repeat request (HARQ) acknowledgement (HARQ-ACK) to a base station for a semi-persistent scheduling (SPS) physical downlink shared channel (PDSCH) transmission include at least one invalid symbol, wherein the one or more symbols are located in a first slot or sub-slot;
generate, by the UE, an offset value (K) as a function of one or more parameters of the SPS PDSCH transmission;
select, by the UE, a second slot or sub-slot, subsequent to the first slot or sub-slot, for sending a delayed HARQ-ACK for the SPS PDSCH transmission, comprising selecting the second slot or sub-slot so as to be at least K slots or sub-slots subsequent to the first slot or sub-slot; and
send, by the UE to the base station, the delayed HARQ-ACK for the SPS PDSCH transmission using the second slot or sub-slot.

12. The apparatus of claim 11, wherein the at least one processor is further configured to select, by the UE, based on the one or more parameters of the SPS PDSCH transmission, a physical uplink control channel (PUCCH) resource for sending the delayed HARQ-ACK for the SPS PDSCH transmission.

13. The apparatus of claim 11, wherein the at least one processor is further configured to select based on the one or more parameters comprising one or more of:
a starting or ending resource block index of the SPS PDSCH transmission;
a slot or sub-slot index of the SPS PDSCH transmission;
a SPS configuration index of the SPS PDSCH transmission; or
a configured scheduling (CS) radio network temporary identifier (CS-RNTI) of the UE.

14. The apparatus of claim 11, wherein
the second slot or sub-slot comprises a $K^{th}$ one of slots or sub-slots subsequent to the first slot or sub-slot.

15. A method of wireless communication, comprising:
determining, by a base station, that one or more symbols scheduled for a user equipment (UE) to report a hybrid automatic repeat request (HARQ) acknowledgement (HARQ-ACK) for a semi-persistent scheduling (SPS) physical downlink shared channel (PDSCH) transmission include at least one invalid symbol, wherein the one or more symbols are located in a first slot or sub-slot;
generating, by the base station, an offset value (K) as a function of one or more parameters of the SPS PDSCH transmission;
selecting, by the base station, a second slot or sub-slot, subsequent to the first slot or sub-slot, for receiving a delayed HARQ-ACK for the SPS PDSCH transmission, comprising selecting the second slot or sub-slot so as to be at least K slots or sub-slots subsequent to the first slot or sub-slot; and
receiving, by the base station from the UE, the delayed HARQ-ACK for the SPS PDSCH transmission on the second slot or sub-slot.

16. The method of claim 15, further comprising selecting, by the base station, based on the one or more parameters of the SPS PDSCH transmission, a physical uplink control channel (PUCCH) resource for receiving the delayed HARQ-ACK for the SPS PDSCH transmission.

17. The method of claim 15, wherein the selecting comprises selecting based on the one or more parameters comprising one or more of:
a starting or ending resource block index of the SPS PDSCH transmission;
a slot or sub-slot index of the SPS PDSCH transmission;
a SPS configuration index of the SPS PDSCH transmission; or a configured scheduling (CS) radio network temporary identifier (CS-RNTI) of the UE.

18. The method of claim 15, wherein the second slot or sub-slot comprises a $K^{th}$ one of slots or sub-slots subsequent to the first slot or sub-slot.

19. The method of claim 15, wherein the second slot or sub-slot comprises a $K^{th}$ one of uplink (U) slots or sub-slots subsequent to the first slot or sub-slot.

20. The method of claim 15, wherein the second slot or sub-slot comprises a $K^{th}$ one of uplink (U) or special(S) slots or sub-slots that are subsequent to the first slot or sub-slot and that include sufficient uplink symbols to transmit the delayed HARQ-ACK.

21. The method of claim 15, wherein the selecting further comprises inputting the one or more parameters to a hash function to output the offset value.

22. The method of claim 21, wherein the selecting further comprises configuring the hash function based on a time division duplexing (TDD) pattern of a communication between the UE and the base station.

23. The method of claim 21, wherein the selecting further comprises configuring the hash function based on a quantity of special(S) or uplink (U) slots or sub-slots that are present subsequent to the first slot or sub-slot in a time division duplexing (TDD) pattern of a communication between the UE and the base station.

24. The method of claim 16, wherein the selecting further comprises:
performing a division operation that divides a parameter of the SPS PDSCH transmission by a quantity of special(S) or uplink (U) slots or sub-slots that are present subsequent to the first slot or sub-slot in a time division duplexing (TDD) pattern of a communication between the UE and the base station; and
selecting the offset value so as to be one plus a modulus of the division operation.

25. An apparatus for wireless communication, comprising:
a memory; and
at least one processor coupled with the memory and configured to:
determine, by a base station, that one or more symbols scheduled for a user equipment (UE) to report a hybrid automatic repeat request (HARQ) acknowledgement (HARQ-ACK) for a semi-persistent scheduling (SPS) physical downlink shared channel (PDSCH) transmission include at least one invalid symbol, wherein the one or more symbols are located in a first slot or sub-slot;
generate, by the base station, an offset value (K) as a function of one or more parameters of the SPS PDSCH transmission;
select, by the base station, a second slot or sub-slot, subsequent to the first slot or sub-slot, for receiving a delayed HARQ-ACK for the SPS PDSCH transmission, comprising selecting the second slot or sub-slot so as to be at least K slots or sub-slots subsequent to the first slot or sub-slot; and
receive, by the base station from the UE, the delayed HARQ-ACK for the SPS PDSCH transmission using the second slot or sub-slot.

26. The apparatus of claim 25, wherein the at least one processor is further configured to select, by the base station, based on the one or more parameters of the SPS PDSCH transmission, a physical uplink control channel (PUCCH) resource for sending the delayed HARQ-ACK for the SPS PDSCH transmission.

27. The apparatus of claim 25, wherein the at least one processor is further configured to select based on the one or more parameters comprising one or more of:
a starting or ending resource block index of the SPS PDSCH transmission;
a slot or sub-slot index of the SPS PDSCH transmission;
a SPS configuration index of the SPS PDSCH transmission; or
a configured scheduling (CS) radio network temporary identifier (CS-RNTI) of the UE.

28. The apparatus of claim 25, wherein
the second slot or sub-slot comprises a $K^{th}$ one of slots or sub-slots subsequent to the first slot or sub-slot.

* * * * *